United States Patent
Casey

(10) Patent No.: US 6,206,444 B1
(45) Date of Patent: Mar. 27, 2001

(54) TAILGATE WINDSPOILER

(76) Inventor: James Casey, 26236 Alizia Canyon Dr., Calabasas, CA (US) 91302

( * ) Notice: Subject to any disclaimer, the term of this patent is extended or adjusted under 35 U.S.C. 154(b) by 0 days.

(21) Appl. No.: 09/248,458

(22) Filed: Feb. 11, 1999

Related U.S. Application Data

(60) Provisional application No. 60/074,452, filed on May 8, 1998, and provisional application No. 60/084,713, filed on Feb. 12, 1998.

(51) Int. Cl.[7] .................................................. B60P 1/267
(52) U.S. Cl. ..................... 296/50; 296/180.5; 296/180.1; 296/57.1
(58) Field of Search ........................ 296/180.5, 180.1, 296/57.1, 50

(56) References Cited

U.S. PATENT DOCUMENTS

| | | | |
|---|---|---|---|
| 3,004,757 | * 10/1961 | Lohr | 296/57.1 |
| 3,977,718 | * 8/1976 | Nordberg | 296/57.1 |
| 4,124,955 | 11/1978 | Kochis . | |
| 4,353,589 | 10/1982 | Hartberg . | |
| 4,372,601 | 2/1983 | Smith . | |
| 4,475,759 | * 10/1984 | Wine | 296/180.5 |
| 4,585,265 | * 4/1986 | Mader | 296/180.1 |
| 4,863,213 | 9/1989 | Deaver et al. . | |
| 5,232,260 | * 8/1993 | Lippard | 296/180.5 |
| 5,234,249 | * 8/1993 | Dorrell | 296/180.1 |
| 5,236,242 | * 8/1993 | Seeman | 296/180.1 |
| 5,352,008 | * 10/1994 | Denvir | 296/180.1 |
| 5,429,411 | * 7/1995 | Spears | 296/180.1 |
| 5,449,212 | * 9/1995 | Seifert | 296/57.1 |
| 5,468,037 | 11/1995 | Peterson et al. . | |
| 5,486,032 | 1/1996 | Reed et al. . | |
| 5,498,058 | * 3/1996 | Kuo | 296/180.1 |
| 5,518,287 | * 5/1996 | Totani | 296/57.1 |
| 5,615,520 | 4/1997 | McGuire . | |
| 5,645,310 | * 7/1997 | McLaughlin | 296/57.1 |
| 5,688,020 | 11/1997 | Burg . | |
| 5,722,714 | * 3/1998 | Vallerand | 296/180.1 |
| 5,735,567 | * 4/1998 | Mora | 296/180.1 |
| 5,743,589 | * 4/1998 | Felker | 296/180.5 |

* cited by examiner

Primary Examiner—Joseph D. Pape
Assistant Examiner—Kiran B. Patel
(74) Attorney, Agent, or Firm—Kelly Bauersfeld Lowry & Kelley, LLP

(57) ABSTRACT

Apparatus are provided which utilize the tailgate of a vehicle, such as a pick-up truck, to create an aerodynamic windspoiler for the vehicle. In one form, the apparatus includes a housing is pivotally attached to the vehicle, and a rod having a first end supported within the housing and a second end attached to the tailgate, wherein the rod is capable of being slidably extended and retracted from the housing. Ideally, the positioning of the rod relative to the housing is controlled relative to the speed of the vehicle to adjust the inclination of the tailgate. This may be accomplished utilizing either an electrically driven motor or an hydraulic cylinder. In another form, the apparatus includes a rotatable shaft attached to a sheet of stretch resistant material. Upon extending and attaching the sheet of material to the tailgate, a windspoil is created.

18 Claims, 4 Drawing Sheets

TAILGATE WINDSPOILER

RELATED APPLICATION

This application claims priority from provisional application Ser. No. 60/074,452 filed Feb. 12, 1998 and provisional application Ser. No. 60/084,713 filed May 8, 1998.

BACKGROUND OF THE INVENTION

The present invention relates to pick-up trucks and like vehicles which have an open bed and a tailgate. More particularly, the present invention relates to utilizing a conventional tailgate to act as an aerodynamic spoiler to reduce wind drag.

By virtue of its very design, pick-up trucks are aerodynamically inefficient. This is due, in large part, to the open bed of the truck which is closed off by a tailgate. Ambient airstreams flow relatively smoothly over the cab down into the bed of the truck, however, the airstream makes an abrupt transition from horizontal flow over the truck bed to a vertical flow when encountering the tailgate. Without a gradual redirection of the airstream, a tremendous amount of drag occurs. This drag increases fuel consumption and reduces available horsepower and vehicle performance. Although wind drag occurs at all speeds, the negative effects become more pronounced as vehicle speed increases.

Attempts have been made to remedy or at least alleviate this problem. These attempts can be classified into two areas, namely reconfiguration of the truck bed and reconfiguration of the tailgate.

Pick-up truck owners have reconfigured the truck bed by placing a cover over the bed. There are many forms of covers. Some are elevated, making the truck cab and bed into what appears to be a single unit. Other covers are placed over only the bed of the truck. These are oftentimes referred to as tonneaus. Tonneaus may be hard or soft and are usually secured to the upper edge of the truck bed. Although at least partially effective at reducing wind drag, these truck bed covers make it difficult to use the pick-up in its intended manner. Typically, objects are constantly being inserted into and removed from the truck bed, requiring removal of the cover before use. However, removal of the cover eliminates the wind drag reduction benefits. The tonneau must also be stored when removed and then re-secured after the objects are taken out of the truck bed. This practice has been found to be very inconvenient.

Other devices have been developed which modify or replace the tailgate itself. Some devices require the manual repositioning or removal of the tailgate and are typically quite cumbersome. Another device mounts spoilers atop the tailgate to direct wind flow. However, this device does not resolve the problem of the drag encountered at the face of the closed tailgate within the bed of the truck. Other devices replace the conventional tailgate with a fabric mesh or pivotal wings. However, these devices drastically alter the appearance of the truck and can also adversely affect the ability to transport items in the bed of the truck.

Thus, what is needed is a device which allows a truck owner to reduce tailgate wind drag without having to manually remove a cover or tailgate. Further, a device is needed which reduces wind drag while allowing the truck owner to conveniently place objects in and out of the truck bed. Additionally, a device is needed which utilizes the original equipment manufactured tailgate of the truck, thus retaining the overall look of the truck. The present invention fulfills these needs and provides other related advantages.

SUMMARY OF THE INVENTION

The present invention resides in apparatus which utilize the tailgate of a vehicle, such as a pick-up truck, to create an aerodynamic windspoiler for the vehicle. In one form, the apparatus comprises, generally, a housing which is attached to the vehicle, a rod having a first end supported within the housing and a second end attached to the tailgate, wherein the rod is capable of being slidably extended and retracted from the housing, and means for controlling the positioning of the rod relative to the housing in relation to the speed of the vehicle.

In one illustrated embodiment, the housing is pivotally attached to the vehicle and the rod is pivotally attached to the tailgate by a pivotal joint. The controlling means comprises an electrically driven motor. The electrically driven motor may be manually actuated or activated by a speed sensing logic control unit.

In another illustrated embodiment, the housing is pivotally attached to the vehicle and the rod is pivotally and removably attached to the tailgate by a pivotal joint. The controlling means comprises an hydraulic cylinder and spring assembly associated with the housing. The spring normally biases the rod towards the housing, but permits the rod to extend in response to ambient air-flow over the tailgate as the speed of the vehicle increases.

In another form of the invention, the apparatus includes, generally, a rotatable shaft attached to a sheet of stretch resistant material which is extendable and retractable from the shaft. A first end of the sheet is attached to the shaft and a second end of the sheet is removably attachable to the tailgate. Upon extending and attaching the sheet of material to the tailgate, a windspoil is created. The sheet has a width substantially the width of the bed of the vehicle and is typically attached to the tailgate with clamps. The shaft may be coupled to a torsional spring which biases the shaft so that the sheet of material is normally wrapped around the shaft when not attached to the tailgate. The shaft is usually attached to the vehicle between the cab portion and wheel wells by frictionally lodging the shaft between opposing bed walls of the vehicle. The apparatus may also include a housing which envelopes the shaft and torsion spring and may be lodged between the walls of the cab. The housing includes a longitudinal aperture through which the sheet passes as it is extended from and retracted back onto the shaft.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
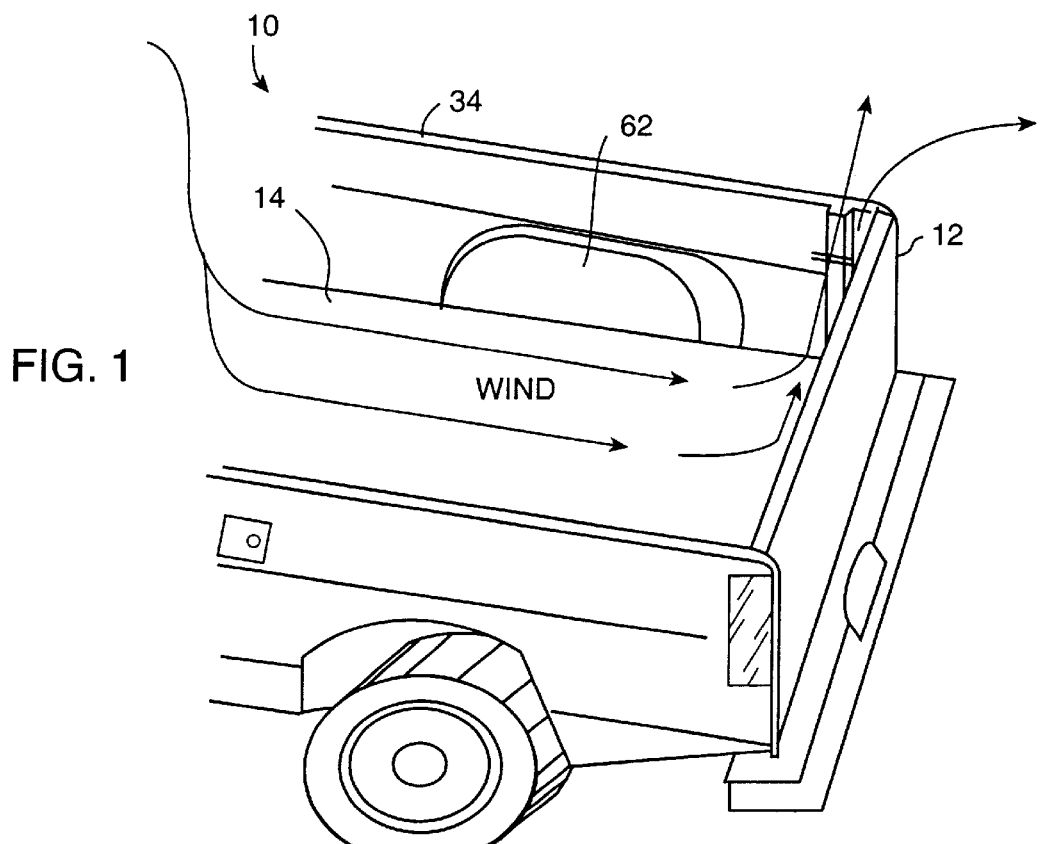
FIG. 1 is a partial perspective view of the bed of a pick-up truck, illustrating the drag created when wind abruptly encounters a closed tailgate.
Figure 2:
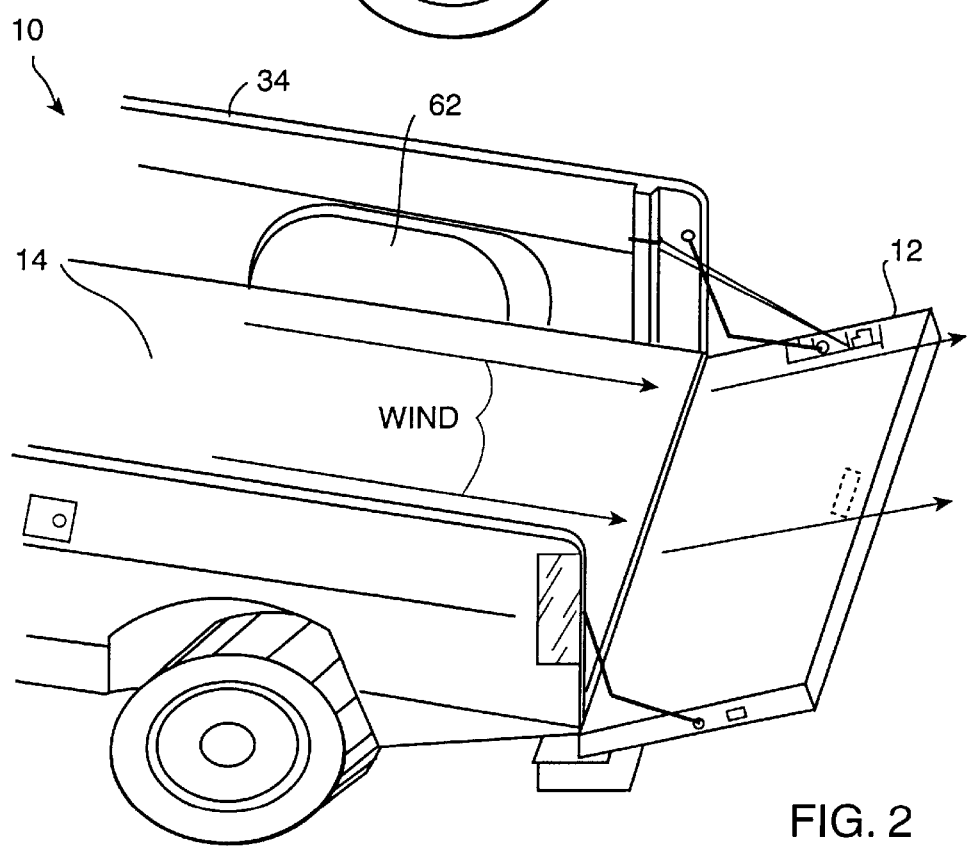
FIG. 2 is a perspective view similar to FIG. 1, illustrating the spoil effect generated when the tailgate is partially opened.

As shown in the drawings for purposes of illustration, the present invention is concerned with an apparatus which is interconnected between a vehicle 10 and a tailgate 12, creating a windspoil which reduces wind drag. As shown in FIG. 1, ambient wind created by movement of the vehicle passes over the cab portion of the vehicle and smoothly transitions into the bed 14 of the vehicle. Upon encountering the tailgate 12, the wind faces an abrupt vertical transition. This abrupt transition creates wind drag which adversely affects vehicle performance. However, when the tailgate 12 is partially opened, as shown in FIG. 2, a windspoil is created and the wind is able to make a smoother transition between the cab 14 and the tailgate 12 which reduces wind drag.

In accordance with the invention, and as illustrated in FIGS. 3–8, the apparatus 16 is comprised, generally, of a housing 18 which is attached to the vehicle 10, an extendable and retractable rod 22 having a first end 24 supported within the housing 18 and a second end 26 removably attached to the tailgate 12. Additionally, means for controlling the positioning of the rod 22 relative to the housing 18 in relation to the speed of the vehicle 10 is also provided and is typically associated with the housing 18. The housing 18 may be pivotally attached to the vehicle 10 by a swivel bracket 20, and the rod 22 may be attached to the tailgate 12 via a pivotal joint 28 in order to allow the tailgate 12 to open and close in response to the extension and retraction of the rod 22.

The apparatus is attached to the vehicle 10 and tailgate 12 by removing the originally equipment manufactured (OEM) latch bolts and strike plates from the tailgate jams as well as the opening latch mechanism and one hinge. Both OEM pivots and one hinge are retained, unaltered. If the apparatus 16 is placed behind a stake post housing 30, an adequate aperture 32 must be created in the stake post housing 30 to allow the rod 22 to fully pivot. The swivel bracket 20 is attached to one of the vertical cargo bed walls 34 through which the housing 18 is inserted and secured. Enough clearance is left to enable the housing 18 to pivot within the bracket 20 without coming into contact with obstructions of the cab wall 34. The rod 22 extends out from the housing 18 and through the aperture 32 created in the stake post housing 30. The rod 20 is attached to the pivotal joint 28 which has been attached to a predetermined site on the tailgate 12.

As vehicle speed increases, the wind drag caused by the ambient wind flow through the bed 14 of the vehicle 10 also increases. To counteract this effect, the rod 22 is extended from the housing 18 and the tailgate 12 is lowered, allowing the wind to flow out of the cab 14 more easily.

Figure 3:
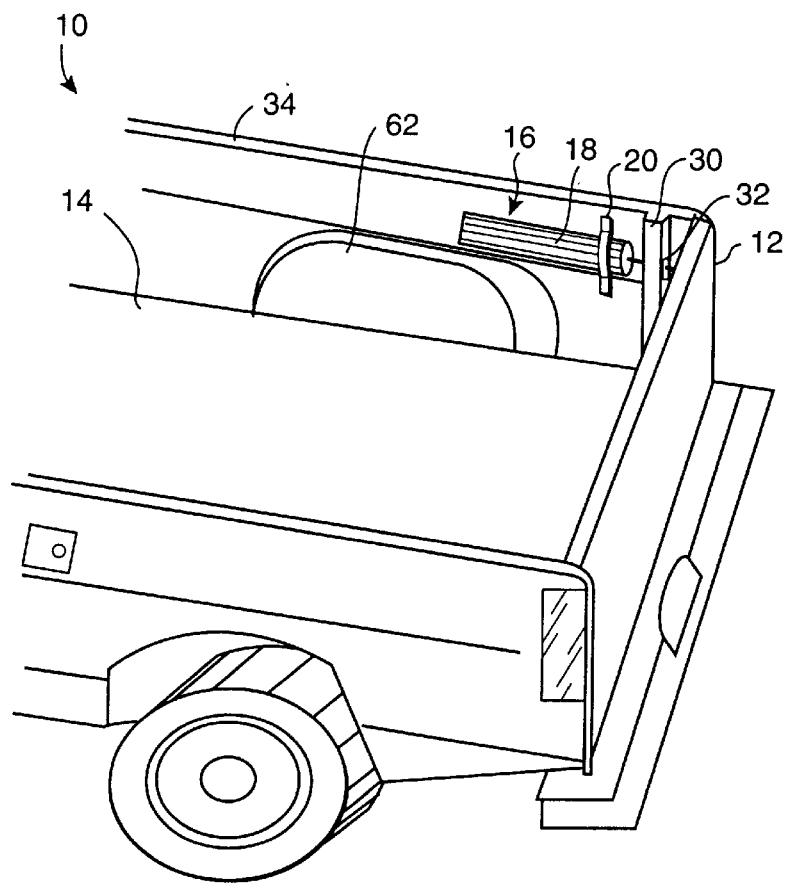
FIG. 3 is a perspective view similar to FIG. 1, showing an hydraulic cylinder apparatus attached to a vehicle and having an extendable rod attached to a closed tailgate.
Figure 4:
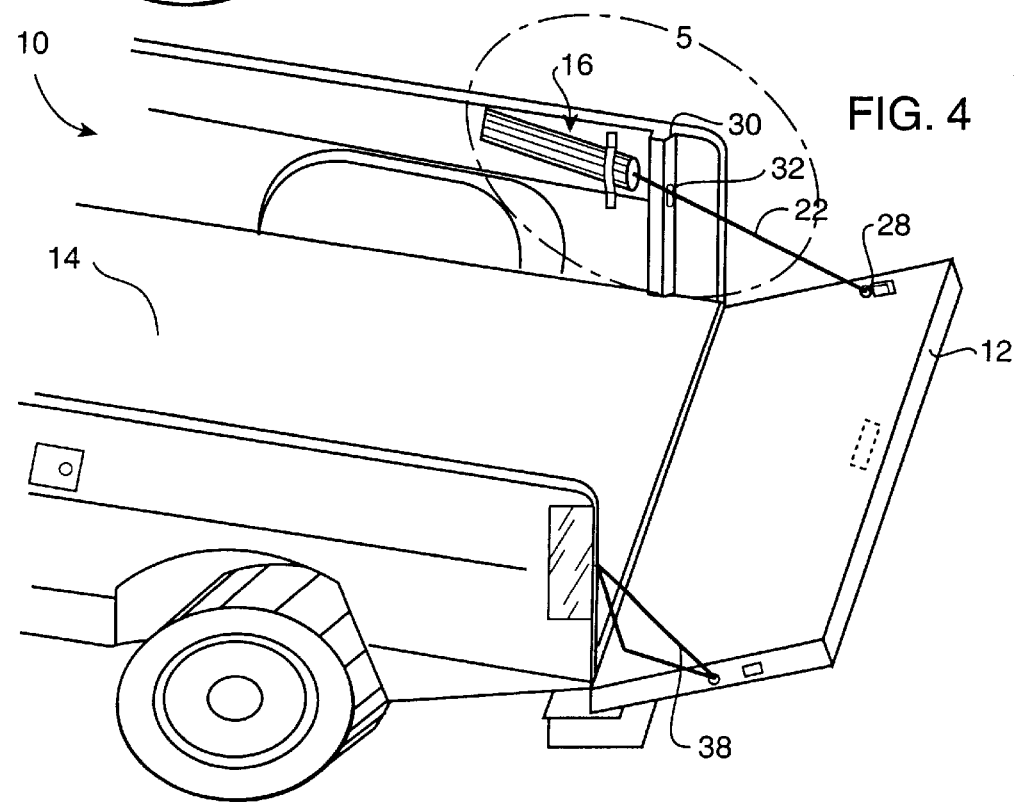
FIG. 4 is a perspective view similar to FIG. 2, illustrating the rod of the hydraulic cylinder apparatus of FIG. 3 in an extended position.
Figure 5:
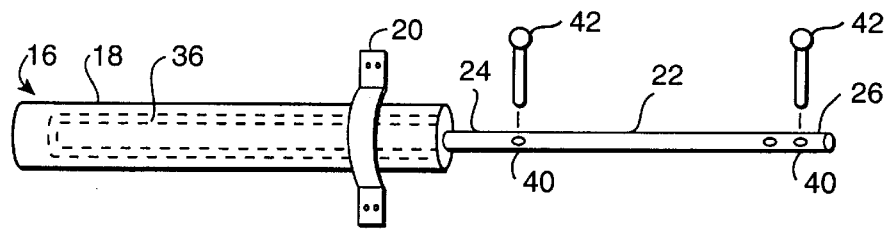
FIG. 5 is an enlarged, partially cross-sectional view of the hydraulic cylinder apparatus of FIG. 4, showing pins for setting the position of the rod relative to the apparatus.

One illustrated form of the invention, as shown in FIGS. 3–5, utilizes a damped mechanical device 16 shown, for illustrative purposes, as an hydraulic fluid damped, spring biased cylinder which forms the housing 18 to open and close the tailgate 12. Attached to the first end 24 of the rod 22 is a piston 36 within the hydraulic cylinder. As vehicle speed increases, the force exerted on the tailgate 12 by the ambient wind increases. This force causes the rod 22 to extend from the housing 18 and allows the tailgate 12 to open partially. As the vehicle speed increases, the force from the wind increases and the rod 22 continues to extend from the housing 18. However, due to the compression of the spring, in the hydraulic cylinder, the rod 22 is normally biased towards the housing 18. Therefore, as the rod 22 extends the piston 36 within the hydraulic cylinder increasingly compresses the spring within the housing 18 causing the extension of the rod 22 to be increasingly resistive. The tailgate 12 remains open until the vehicle speed and wind force are reduced and the rod 22 is then retracted into the housing 18 by the compression of the hydraulic cylinder until the tailgate 12 is fully closed.

A cable 38 may be interconnected between the vehicle 10 and the tailgate 12 to ensure that the tailgate 12 is not allowed to fully open. The cable 38 may be attached to a fastener of the tailgate 12. The cable 38 and the rod 22 may be removed from the tailgate 12 and the pivotal joint 28, respectively, in order to either fully open or even remove the tailgate 12 in order to load or unload objects from the bed 14 of the vehicle 10. The rod 22 may have apertures 40 through which pins 42 can be inserted in order to the tailgate 12 at a predetermined angle or held in a closed position. Typically, the pins 42 come into contact with an obstruction, such as the stake post housing 30, which impedes further extension of the rod 22, thus holding the tailgate 12 in place.

Figure 6:
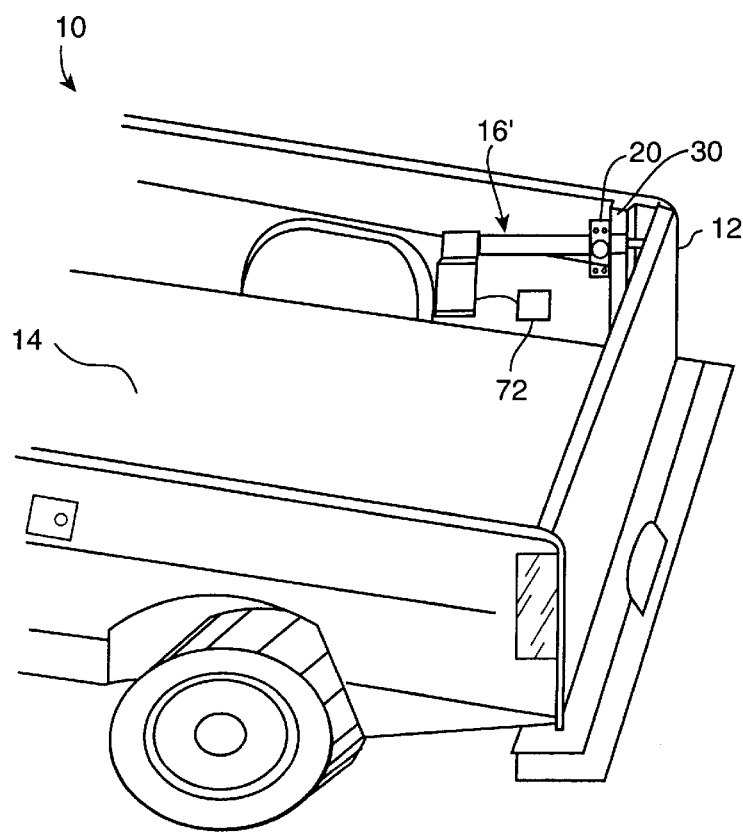
FIG. 6 is a partial perspective view similar to FIGS. 1 and 3, showing a motorized apparatus attached to a vehicle and having an extendable rod attached to a closed tailgate.
Figure 7:
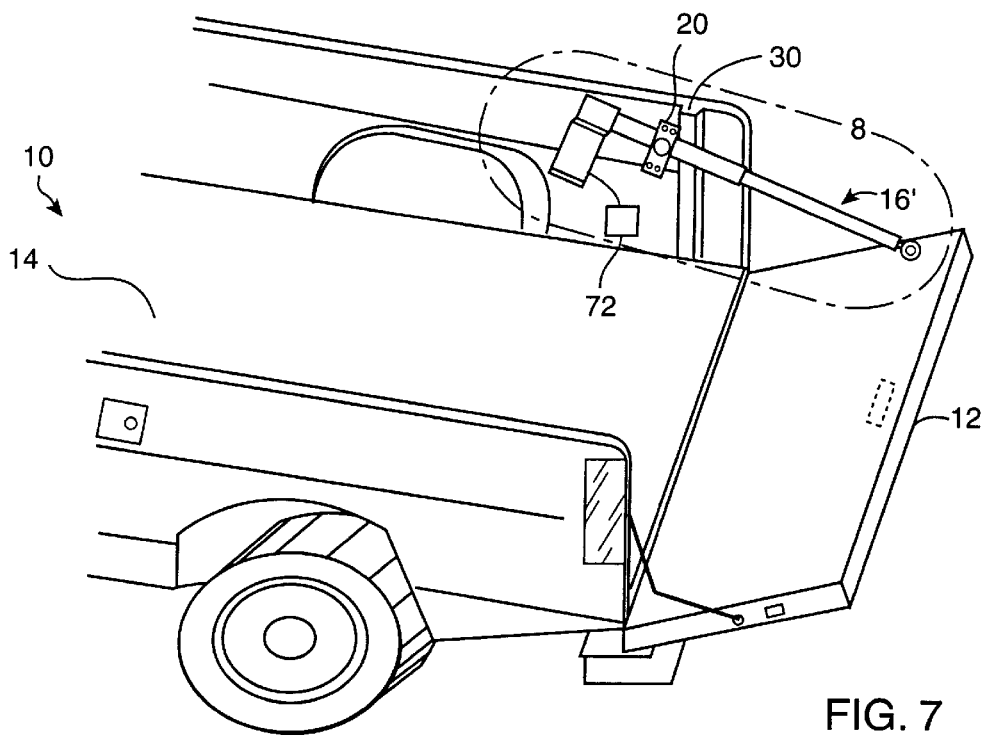
FIG. 7 is a perspective view similar to FIGS. 2 and 4, illustrating the rod of the motorized apparatus of FIG. 6 in an extended position.
Figure 8:
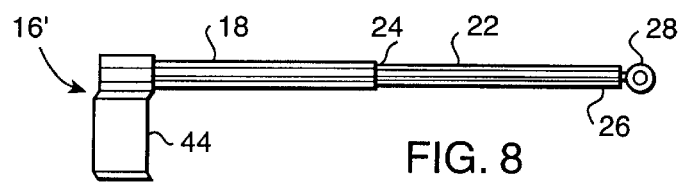
FIG. 8 is an enlarged view of the motorized apparatus of FIG. 7.

Another form of the present invention is illustrated in FIGS. 6–8. The housing 18 of this apparatus 16' is associated with an electric motor 44, preferably a gear head type, which is able to extend and retract the rod 22. The motor is preferably connected to the electrical system of the vehicle 10. The motor 44 can be activated manually by an electric switch, such as a toggle switch positioned in the cab of the vehicle, or a remote transmitter switch, such as a key chain radio transmitter. Using the switch, the operator of the vehicle 10 can lower the tailgate 12 to whatever angle is desired at any given speed. This is particularly useful when loading and unloading the bed 14 of the vehicle 10 as the tailgate 12 can be fully opened without disconnecting the rod 22 from the tailgate 12. The ability to fully open the tailgate 12 is useful while in reverse as the user is able to view small children or other obstructions which would otherwise not be visible. The tailgate 12 may also be locked in not only completely open or closed positions, but at any partially opened position.

The electric motor 44 may also be controlled automatically with a logic control circuit designed to discriminate differing vehicle speeds. The logic control circuit 72 is designed to discriminate two velocities, one for deployment and the other for retraction. The logic control circuit 72 can tap into the vehicle's existing computer to obtain the speed of the vehicle 10, or can be in circuit with a vehicle speed sensor. Speed sensors are typically comprised of a small magnet trigger affixed to the drive shaft of the vehicle and associated with a receiver placed in proximity of the trigger so as to induce an electromagnetic pulse. This signal is relayed to the logic circuit and vehicle speed is determined. When the vehicle 10 attains predetermined speeds, a relay is tripped and a voltage is supplied to the motor for desired action. The control circuit 72 employs both linear and digital integrated circuit devices addressing multiple function, safety, and product reliability concerns.

The motor 44 may be actuated to extend or retract the rod 22 at a given predetermined speed, or incrementally extend or retract the rod 22 at various predetermined speeds. These speeds do not need to be the same value. For example, at 48 m.p.h. the motor 44 may be activated to extend the rod 22 which lowers the tailgate 12 to a predetermined angle, for example 60°; once the vehicle slows to 35 m.p.h. the motor 44 would be activated to retract the rod 22 which would close the tailgate 12. A redundant system may be employed to prevent unwanted closure of the opened tailgate 12 during vehicle operation in order to protect items placed in the vehicle 10 which are longer than the bed 14. The tailgate 12 can be locked in a closed position to prevent transported items from falling out of the vehicle as well.

The apparatus electronic control allows the user to fully open the tailgate 12 while backing up to view small children or obstructions.

Figure 9:
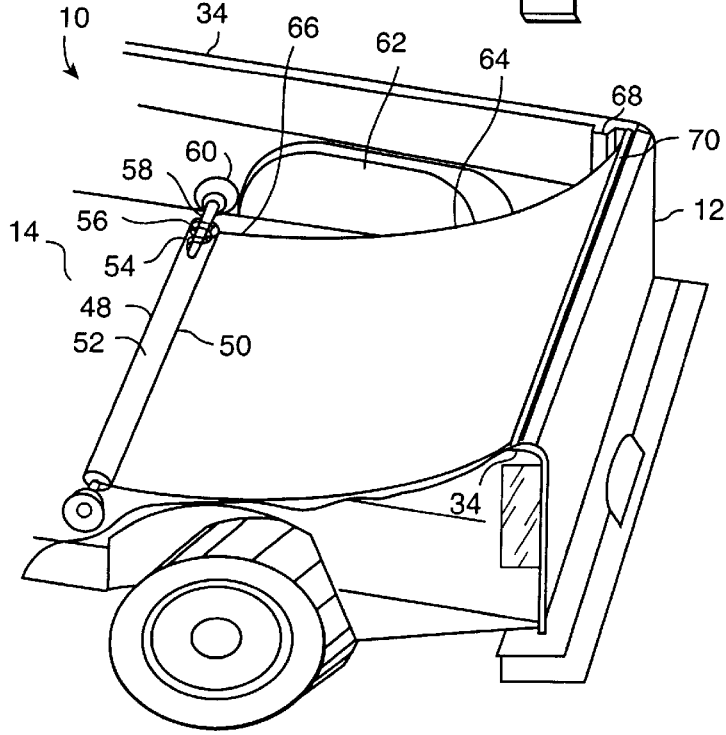
FIG. 9 is a partial perspective view similar to FIGS. 1, 3 and 6, showing a windspoiler apparatus lodged between opposing walls of the vehicle bed and having a sheet attached to the tailgate.

FIG. 9 illustrates yet another form of the invention wherein an apparatus 46 is comprised, generally, of a rotatable shaft 52 connected to the vehicle 10 and a sheet 64 of stretch resistant material attached at one end to the shaft 52 and removably attachable to the tailgate 12 at another end. The sheet 64 is extendable from and retractable to the rotatable shaft 52. The shaft 52 may be coupled with a torsion spring 54 which acts to wind the sheet 64 around the shaft 52. A housing 48 having an aperture 50 substantially along its axis may envelope the shaft 52 and torsion spring 54.

The sheet 64 of stretch resistant material may have a width approximately equal to the width of the bed 14 of the vehicle 10. The sheet 64 is manually extendable from the housing aperture 50 and typically attached to the tailgate 12 with clamps 70, such as hood clamps. A rod may be attached to the sheet 64 to facilitate removal from the housing 48 and also to give stability to the attachment of the sheet 64 to the tailgate 12. When the sheet 64 is removed from the tailgate 12, the tensioned torsion spring 54 releases causing the shaft 52 to rotate and the sheet 64 to be rewound about the shaft 52.

The housing 48 may include threaded female ends 56 which are engaged with threaded male shafts 58 having rubber mounting shoes 60. The male shafts 58 have opposite right and left hand threads. The housing 48 is preferably secured to the vehicle 10 toward the front cab portion of the wheel wells 62 by rotating the cylindrical housing 48 which causes the oppositely threaded male shafts 58 to rotate outwardly and the rubber mounting shoes 60 to come into contact with opposite bed walls 34, frictionally holding the housing 46 in place.

By attaching the sheet 64 to the tailgate 12, a windspoil is created which results in a smooth wind flow transition between the bed 14 of the vehicle 10 and the tailgate 12. The windspoil is easily removed by detaching the sheet 64 from the tailgate 12 and allowing the sheet 64 to retract into the housing 48 by scrolling onto the central shaft 52. The entire apparatus 46 may be removed from the vehicle 10 by rotating the cylindrical housing 48 such that the rubber mounting shoes 60 become dislodged from the vehicle bed walls 34.

The present invention allows a vehicle owner to create a windspoil which reduces vehicle inefficiency due to wind drag. The windspoil may be manually or automatically adjusted to varying vehicle created wind speeds while allowing the vehicle owner to lock the tailgate 12 shut or completely open the tailgate 12. This control allows the owner to easily place objects into and out of the bed 14 of the vehicle 10 without removing the apparatus. One of the most important aspects of the present invention is that it accomplishes the above results while retaining the OEM tailgate 12, and thus the original look of the vehicle.

Although several embodiments have been described in detail for purposes of illustration, various modifications may be made without departing from the scope and spirit of the invention. Accordingly, the invention is not to be limited, except as by the appended claims.

What is claimed is:

1. An apparatus for positioning a tailgate which is pivotally attached to a vehicle, comprising:

a housing attached to the vehicle;

a rod having a first end supported within the housing and a second end attached to the tailgate, the rod being extendable and retractable relative to the housing; and means for controlling the positioning of the rod relative to the housing.

2. The apparatus of claim 1, wherein the controlling means comprises an electrically driven motor.

3. The apparatus of claim 2, wherein the electrically driven motor is manually activated.

4. The apparatus of claim 3, wherein the motor is activated by an electric switch in a cab of the vehicle.

5. The apparatus of claim 3, wherein the motor is activated by a wireless remote transmitter switch.

6. The apparatus of claim 1, wherein the controlling means positions the rod relative to the housing in relation to the speed of the vehicle.

7. The apparatus of claim 6, wherein the controlling means comprises an electrically driven motor.

8. The apparatus of claim 7, wherein the electrically driven motor is manually activated.

9. The apparatus of claim 7, wherein the electrically driven motor is activated by a speed sensing logic control unit.

10. The apparatus of claim 7, wherein the electrically driven motor is activated by a control unit.

11. The apparatus of claim 1, wherein the housing is pivotally attached to the vehicle and the rod is pivotally attached to the tailgate.

12. An apparatus for positioning a tailgate which is pivotally attached to a vehicle, comprising:

an elongated housing pivotally attached to the vehicle;

a rod having a first end supported within the housing and a second end pivotally attached to the tailgate, the rod being extendable and retractable relative to the housing; and means for controlling the positioning of the rod relative to the housing in relation to the speed of the vehicle.

13. The apparatus of claim 12, wherein the controlling means comprises an electrically driven motor.

14. The apparatus of claim 13, wherein the electrically driven motor is manually activated.

15. The apparatus of claim 13, wherein the electrically driven motor is actuated by a speed sensing logic control unit.

16. The apparatus of claim 14, wherein the motor is activated by a wireless remote transmitter switch.

17. The apparatus of claim 14, wherein the motor is activated by an electrical switch in a cab of the vehicle.

18. The apparatus of claim 12, wherein the rod is attached to the tailgate by a pivotal joint.

* * * * *